US007257479B2

(12) United States Patent
Damitz et al.

(10) Patent No.: US 7,257,479 B2
(45) Date of Patent: Aug. 14, 2007

(54) METHOD AND DEVICE FOR CONTROLLING AN INTERNAL COMBUSTION ENGINE

(75) Inventors: Jens Damitz, Illingen (DE); Matthias Schueler, Steinheim (DE); Stefan Polach, Stuttgart (DE); Michael Kessler, Leonberg-Warmbronn (DE); Andreas Schaffrath, Korntal-Muenchingen (DE); Nicole Kositza, Gerlingen (DE); Axel Loeffler, Backnang (DE); Marko Schuckert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 11/210,937

(22) Filed: Aug. 23, 2005

(65) Prior Publication Data

US 2006/0064230 A1 Mar. 23, 2006

(30) Foreign Application Priority Data

Sep. 23, 2004 (DE) ...................... 10 2004 046 086

(51) Int. Cl.
*G06F 17/00* (2006.01)
*F02M 7/00* (2006.01)
*F02D 9/02* (2006.01)

(52) U.S. Cl. ...................... 701/105; 701/103; 123/399; 123/435

(58) Field of Classification Search ................ 123/361, 123/396, 399, 403, 435, 436, 478, 480; 701/101–105, 701/110–113
See application file for complete search history.

(56) References Cited

U.S. PATENT DOCUMENTS

| | | | | |
|---|---|---|---|---|
| 4,532,592 | A * | 7/1985 | Citron et al. | 701/105 |
| 4,697,561 | A * | 10/1987 | Citron | 701/110 |
| 5,069,183 | A * | 12/1991 | Nagano et al. | 123/435 |
| 5,670,713 | A * | 9/1997 | Machida et al. | 123/436 |
| 5,955,664 | A * | 9/1999 | Aoki et al. | 73/117.3 |
| 6,644,274 | B2 * | 11/2003 | Hasegawa et al. | 123/406.26 |
| 6,961,652 | B2 * | 11/2005 | Amano | 701/105 |
| 2006/0169243 | A1 * | 8/2006 | Neunteufl et al. | 123/435 |

FOREIGN PATENT DOCUMENTS

DE 103 05 656 1/2004

* cited by examiner

*Primary Examiner*—Willis R. Wolfe, Jr.
(74) *Attorney, Agent, or Firm*—Kenyon & Kenyon LLP

(57) ABSTRACT

A method and a device for controlling an internal combustion engine are provided, in which method and device a deviation value is determined based on the comparison of a variable characterizing the combustion process in at least one cylinder with a corresponding setpoint value for this variable. Based on the determined deviation value, a first manipulated variable of a first actuator for influencing the start of activation is adjusted. Furthermore, based on the first manipulated variable, a second manipulated variable of a second actuator for influencing the air mass is adjusted.

9 Claims, 4 Drawing Sheets

METHOD AND DEVICE FOR CONTROLLING AN INTERNAL COMBUSTION ENGINE

FIELD OF THE INVENTION

The present invention relates to a method and a device for controlling an internal combustion engine, e.g., by influencing the air mass for the cylinders.

BACKGROUND INFORMATION

A method and a device for controlling an internal combustion engine are described in published German patent document DE 103 05 656, in which a manipulated variable of an actuator is computed based on the comparison of a variable characterizing the combustion process in at least one cylinder to a setpoint value for this variable, for influencing at least one additional manipulated variable. The output signal from a structure-borne noise sensor is used to generate the variable. Based on the signal from the structure-borne noise sensor, a feature is obtained there which is adjusted to a predetermined setpoint value. Cylinder-specific variables which characterize the combustion process in at least one cylinder may also be obtained based on a combustion chamber pressure sensor.

Various characteristics which characterize the combustion process in at least one cylinder may be obtained and used for regulation, based on a structure-borne noise sensor and/or a combustion chamber pressure sensor.

Homogeneous and/or partially homogeneous combustion processes are characterized by a high exhaust gas recirculation rate in combination with injection, modified with respect to conventional combustion, for achieving a high ignition delay. These combustion processes are usually used only in partial regions of the engine characteristics map, in addition to the conventional combustion process. Low emissions, in particular of nitrogen oxides and particulates, occur in homogeneous combustion processes.

However, these homogeneous combustion processes exhibit high sensitivity in particular to tolerances in cylinder filling, which is defined by the air-fuel ratio. Therefore, the advantages in controlled operation are not fully realized, or are not realized at all. Furthermore, it is problematic that the control units for controlling and/or regulating cylinder filling are generally not designed for individual cylinders. It is also common to control the transition between the various operating modes, i.e., the transition between conventional and homogeneous combustion.

An object of the present invention is to reduce the sensitivity of the homogeneous combustion process with respect to tolerances in cylinder filling in both steady-state and dynamic operation, within the homogeneous operating mode as well as during changes in operating mode.

SUMMARY

The regulation and/or control of the partially homogenous or entirely homogenous combustion may be significantly improved by determining a deviation value based on the comparison of a variable characterizing the combustion process in at least one cylinder to a setpoint value for this variable and, by adjusting a first manipulated variable of a first actuator based on the deviation value, for influencing the start of activation, and by adjusting a second manipulated variable of a second actuator based on the first manipulated variable for influencing the air mass. This variable which characterizes the combustion process is also referred to below as a feature.

According to the present invention, the effects of tolerances in cylinder filling on the combustion are detected by a suitable sensor, e.g., a combustion chamber pressure sensor or a structure-borne noise sensor, and are partially and/or completely compensated for (and thus mitigated) via cylinder-specific interventions in the injection. To this end, a variable characterizing the combustion process is determined from the output signal of the sensor. This variable is regulated to a setpoint value on a cylinder-specific basis. A variable characterizing the start of injection, referred to below as start of activation AB, is used as the manipulated variable for this control circuit.

In one example embodiment of the present invention, a correction value is deduced for the cylinder filling based on these corrective interventions in the injection, e.g., the average value of these corrective interventions. In other words, a corrective intervention in a global cylinder variable, e.g., the air mass, is generated from the individual corrective interventions performed on a cylinder-specific basis. This enables the partially homogenous combustion to take place much more accurately compared to the controlled operation, despite actual tolerances in the cylinder filling, thereby resulting in significant improvements in emissions and comfort.

DETAILED DESCRIPTION

Figure 1:
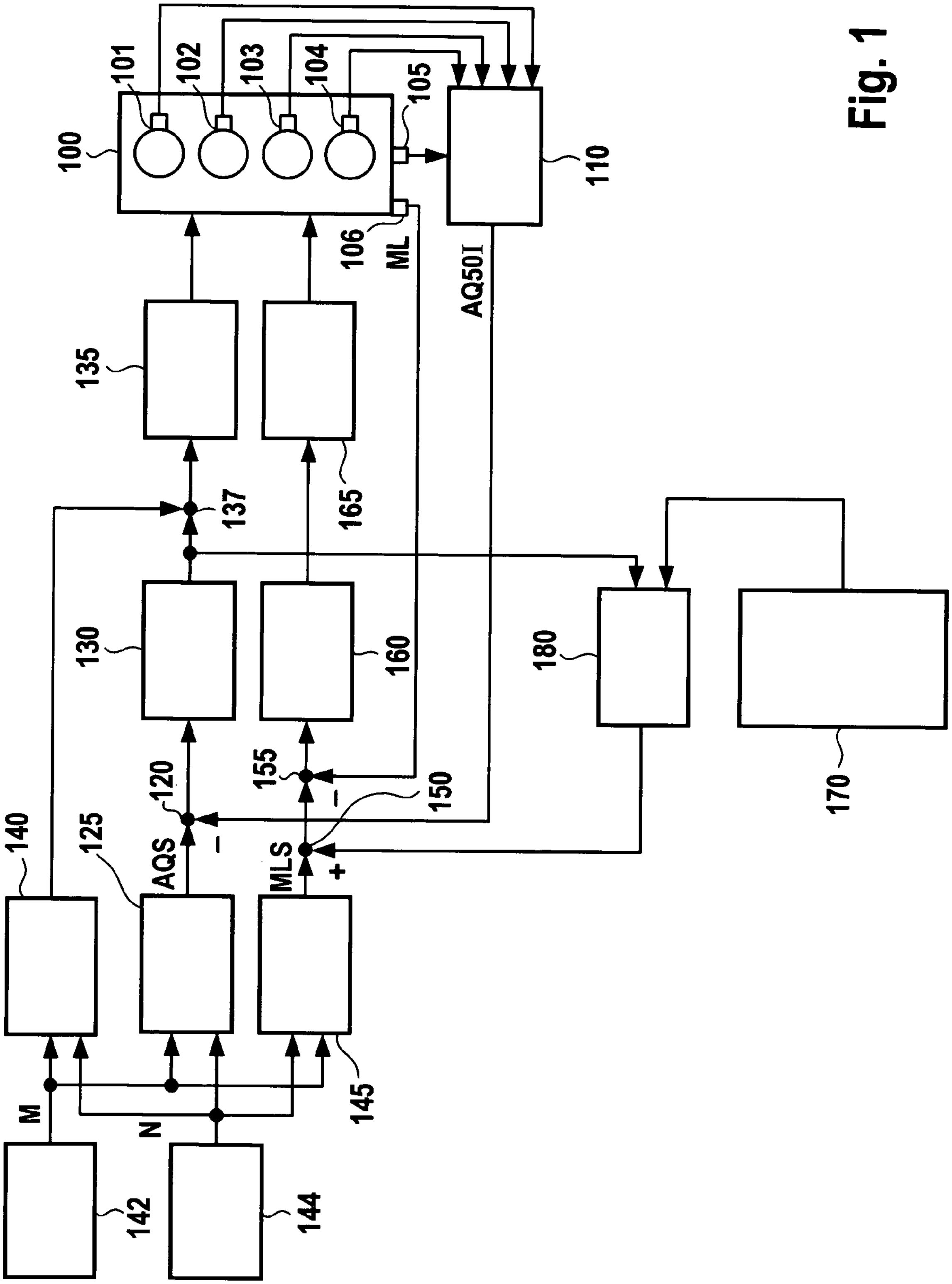
FIG. 1 is a schematic diagram illustrating an example method and an associated example system according to the present invention.

FIG. 1 illustrates an example method and an associated example system according to the present invention. An internal combustion engine having four cylinders is designated by reference numeral 100. The number of cylinders is selected only as an example, and may also be greater or smaller. In the exemplary embodiment illustrated, sensors 101-104 which generate a signal characterizing the combustion process are associated with the four cylinders. This number of sensors represents the maximum quantity, and it is also possible to use fewer sensors, in particular for structure-borne noise signals. A sensor 105 which supplies a signal characterizing crankshaft position $K_w$ is also provided at the crankshaft of the internal combustion engine. In addition, a sensor 106 is provided which detects a signal pertaining to fresh air mass ML actually supplied to the internal combustion engine.

The signals from sensors 101-104 arrive at a feature calculation unit 110 which relays a feature AQ50I to a node 120. Output signal AQS, which is supplied by a setpoint value setter 125 for feature AQ50, is applied to the second input of node 120. The output signal from node 120 acts on an AQ50 regulator 130, which in turn acts on an injection system 135 and a setpoint value adapter 180. An AQ50 regulator may be provided for each cylinder. Alternatively, one regulator may be provided, to which the signals from the various cylinders are supplied in succession. The output signal from a control logic unit 170 is applied to a second input of air mass setpoint value adapter 180.

Injection system 135 meters a predetermined quantity of fuel to the individual cylinders of the internal combustion engine at a certain time or at a certain position of the crankshaft. The time or the position of the crankshaft is a function essentially of start of activation AB, which is specified by AQ50 regulator 130 and setpoint value setter 140. The output signal from AQ50 regulator 130, i.e., the correction of start of activation AB, is supplied to injection system 135 via a node 137. The output signal from a setpoint value setter 140 for the start of activation is applied to the second input of node 137. A torque setpoint value M and a rotational speed signal N are applied to the input of setpoint value setter 140. Similarly, at least one torque setpoint value M and one rotational speed signal N are likewise applied to another setpoint value setter 125. Torque setpoint value M is specified by a torque setpoint value setter 142, and rotational speed N is determined by a rotational speed sensor 144.

Furthermore, these two signals M and N are also supplied to Yet another setpoint value setter 145, which specifies a setpoint value MLS for the air mass. Setpoint value MLS is applied, via node 150 and node 155, to an air mass regulator 160, which in turn actuates air system 165 with a corresponding signal. The air system supplies a specified air mass to the individual cylinders of the internal combustion engine as a function of the actuating signal.

Figure 2:
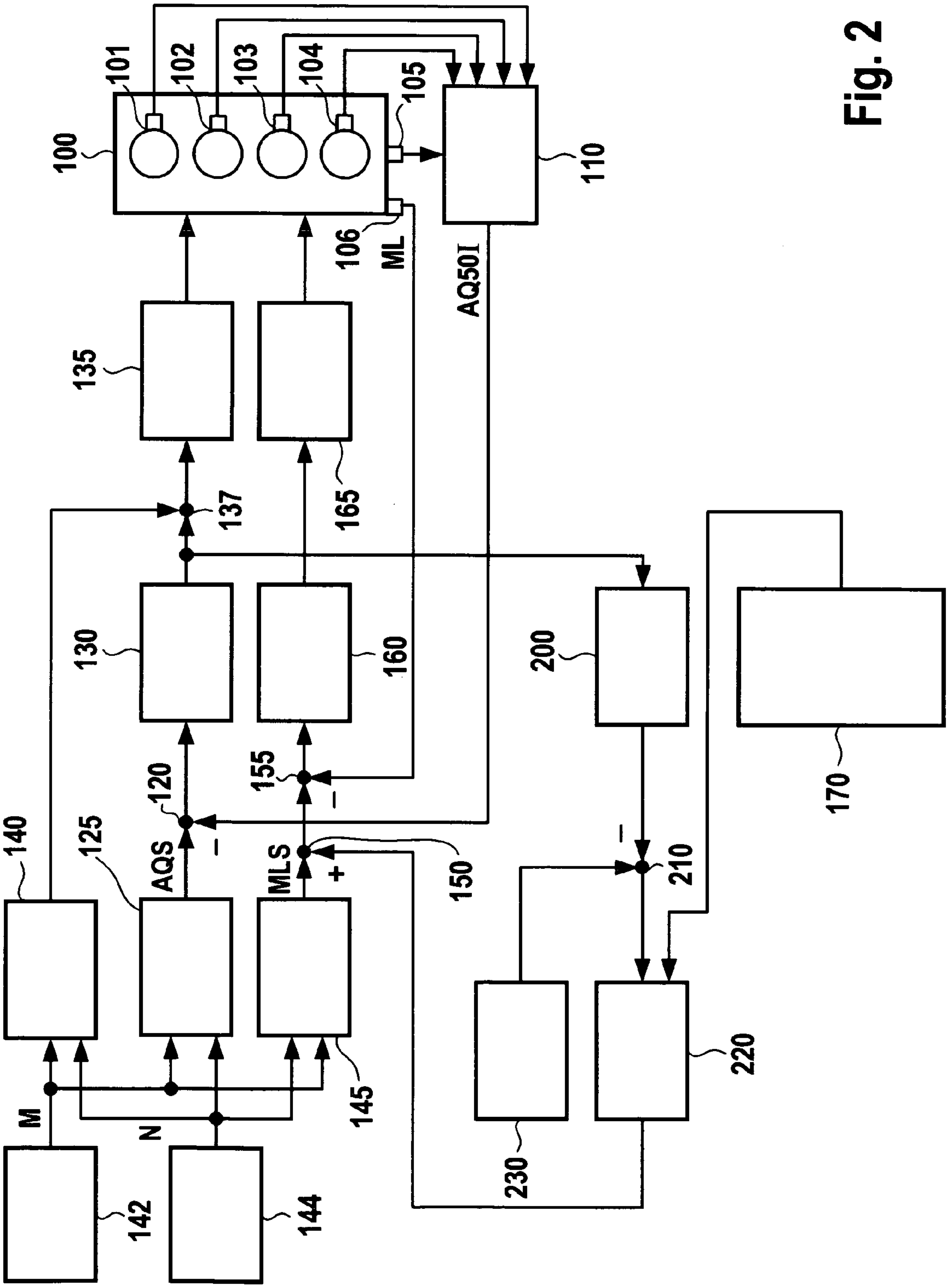
FIG. 2 is a schematic diagram illustrating an example method and an associated example system according to the present invention, which diagram shows the air mass setpoint value adapter 180 of FIG. 1 in greater detail.

FIG. 2 illustrates air mass setpoint value adapter 180 in greater detail. The other blocks already described in FIG. 1 are designated by the same reference numerals. The output signal from AQ50 regulator 130 is supplied to an averaging unit 200. The output signal from averaging unit 200 is supplied, via a node 210, to a regulator 220 for start of activation average value ABMW. The output signal from yet another setpoint value setter 230 is applied to the second input of node 210. Node 150 is acted on by the output signal from regulator 220. The signal from control logic unit 170 likewise is supplied to regulator 220.

In summary, setpoint value setter 140 computes a setpoint value for the start of activation, based on torque setpoint value M and rotational speed N of the internal combustion engine. Based on this setpoint value, injection system 135 actuates a corresponding actuator so that the injection begins at the setpoint value specified by setpoint value setter 140. Furthermore, based on the appropriate variables, such as rotational speed N and torque setpoint value M, for example, setpoint value setter 145 specifies a setpoint value MLS for the intended air mass. This setpoint value is corrected using the output signal from an ABMW regulator, and then in node 155 is compared to actual air mass ML detected by sensor 106. Based on this comparison, air mass regulator 160 determines an actuating signal to be supplied to the air system. The air system acts on a corresponding actuator in such a way that the appropriate air mass is supplied to the internal combustion engine.

The actuator for injection system 135 may be a solenoid valve or a piezoelectric actuator which controls the fuel metering into a fuel injector. The actuator for air system 165 is, for example, an exhaust gas recirculation flap and/or exhaust gas recirculation valve which influences the air flow in an exhaust gas recirculation line, thereby controlling the fresh air mass supplied to the internal combustion engine. Alternatively, other actuators may also be provided.

These elements correspond to a customary control of an internal combustion engine in which the fuel quantity and the air mass are controlled. It is usually not possible to directly regulate the start of activation, since no corresponding sensors are present which detect the actual start of activation. According to the present invention, a corresponding signal is detected by sensors 101-104 or a fewer number of sensors. This signal may be a signal which characterizes the combustion chamber pressure or the structure-borne noise. Based on these signals, feature calculator 110 computes a feature which characterizes the combustion. In this example, value AQ50 is used as the characteristic feature. Feature AQ50 corresponds to the angular position of the crankshaft at which 50% of the total energy conversion from combustion has occurred. Feature AQ50 characterizes the center of gravity of the combustion.

As an alternative to the feature AQ50, any other given feature deduced from the combustion chamber pressure or the structure-borne noise signal may also be used. These are, for example, the start of combustion, other percentage conversion points, combustion rate, or other significant points in the structure-borne noise signal.

The feature thus obtained is linked in node 120 to a corresponding setpoint value AQS. The deviation of the intended value from the actual value of the feature arrives at AQ50 regulator 130. Based on the deviation, regulator 130 computes a correction value for correcting the output signal from setpoint value setter 140. In other words, setpoint value setter 140 acts as a pilot control for the AQ50 regulation. That is, the feature which characterizes the combustion process is regulated to a setpoint value, and the start of activation is used as the manipulated variable.

As an alternative to the illustrated structure having a pilot control, it is also possible to use only one regulation or pilot control. In other words, the setpoint value is specified and adjusted directly via block 125, similarly as in block 140.

A regulation which as a function of a manipulated variable modifies the start of activation is able to only partially compensate for tolerances present in the region of the air system. In particular, tolerances acting on all cylinders cause the start of activation to be unnecessarily modified. Therefore, according to the present invention the output signal from AQ50 regulator 130 is supplied to a setpoint value adapter 180, as shown in FIG. 1. Based on the individual correction values, i.e., output signals, from regulator 130 for the individual cylinders, setpoint value adapter 180 computes a correction value for modifying the output signal of setpoint value setter 145. In other words, based on the output variables for the individual regulators for the individual cylinders, a correction value is generated and supplied to the actuator of the air system. As an alternative to the intervention in the setpoint value, setpoint value adapter 180 may also intervene in the output signal of regulator 160 and correct the output signal from regulator 160 as needed.

As can be seen from the above, based on the first manipulated variable it is possible to adjust a second manipulated variable for influencing the air mass. The first manipulated variable is adjusted to the second manipulated variable by correcting the setpoint value. The setpoint value of a regulation for adjusting the air mass is corrected as a function of the first manipulated variable, this correction depending on the average value of the manipulated variables for multiple cylinders. In other words, the second manipulated variable is specified from the average value of the deviation values for at least two cylinders.

The example embodiment of the setpoint adaptation illustrated in FIG. 2 will be explained in detail below. Averaging unit 200 computes the average value of the output signals from AQ50 regulator 130 for the individual cylinders. In node 210 these values are compared to the output signal from setpoint value setter 230. Based on the deviation of the average value of all output signals of the AQ50 regulator from the setpoint value, regulator 220 then specifies an output signal for correcting setpoint value MLS. The setpoint value for the average value may be set to zero, for example. It is assumed that an error in the air system causes a deviation of the average value from zero. If the internal combustion engine meters an excessively large air mass, for example due to an error, the AQ50 values for all cylinders are shifted in the same direction (early). This joint shift is then compensated for by a correction of the air mass.

Figure 3:
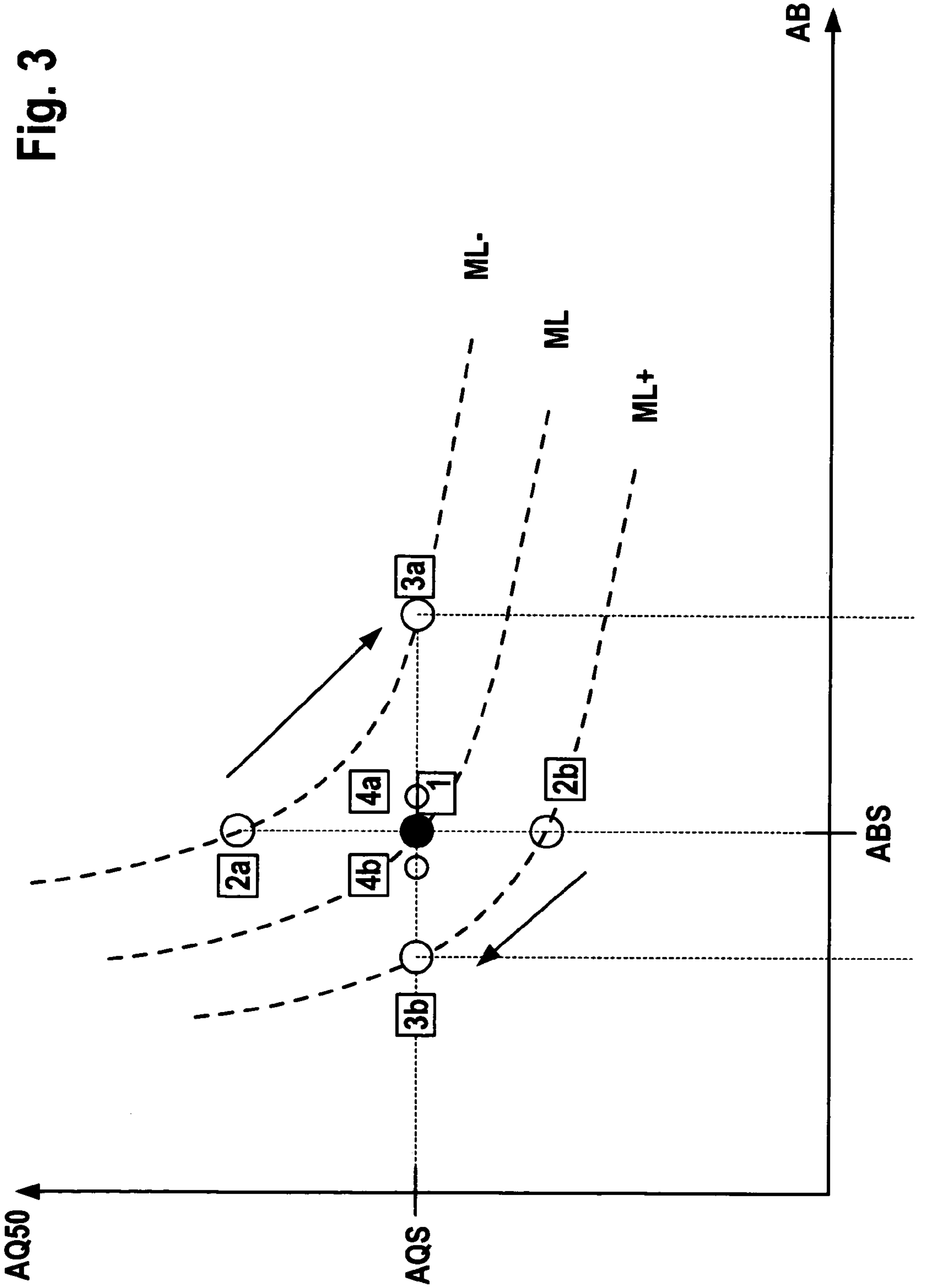
FIG. 3 is a graph illustrating a variable characterizing the combustion process as a function of the start of activation and the air mass.

Start of activation AB is plotted as a function of feature AQ50 in FIG. 3. Various curves of feature AQ50, shown as dashed lines, for various air masses ML are plotted against start of activation AB. A first line designated as ML corresponds to the exact air mass. A second line designated by ML-corresponds to an air mass that is too small, and a third line designated by ML+ corresponds to an air mass that is too large.

Furthermore, various operating points are designated by reference numerals 1, 2*a*, 2*b*, 3*a*, 3*b*, 4*a*, and 4*b*. Point 1 corresponds to the exact operating point without tolerances. In other words, activation is performed for the intended start of activation ABS, and the intended feature AQS is reached, the exact air mass ML being supplied to the internal combustion engine. This operating point is usually not achieved because of tolerances. If, for example, the supplied air mass is too small, point 2*a*, for example, is reached. In other words, feature AQ50 is present at a later time than intended. If regulator 130 now corrects the start of activation in the "early" direction, point 3*a* is reached. Feature AQ50 has the intended value AQS at point 3*a*. However, the exact operating point 1 is not reached due to tolerances in the air system. The same is true when too large an air mass is supplied; in this case the operating point moves from point 2*b* to point 3*b* when the start of activation is corrected.

Using an additional correction of the air mass, it is possible to move the internal combustion engine from operating point 3*a* to operating point 4*a*, or from operating point 3*b* to operating point 4*b*. To this end, a correction of the air mass, for example by air mass setpoint value adapter 180, is necessary. In other words, using a combined correction of the start of activation based on feature AQ50 and a correction of the air mass based on feature AQ50, it is possible to reach the intended working point almost exactly. It is thus possible to precisely control the internal combustion engine, in particular in homogeneous or partially homogeneous operation. The effects of a modified air mass on the combustion may be compensated for by the regulation of feature AQ50 according to the present invention. The air mass variations result from tolerances and errors in the air mass sensor as well as from actual deviations in the filling of the cylinders.

By use of the regulation, the deviation of the combustion position from the setpoint value of feature AQS may be minimized using cylinder-specific corrective interventions at the start of activation, and states 3*a* or 3*b* may be achieved. This procedure may be used to achieve stability in homogeneous combustion, which advantageously improves overall emissions. Furthermore, it is advantageous when this regulation is combined with air mass setpoint value adaptation. In other words, the average values of the cylinder-specific corrective interventions in the AQ50 regulator are corrected by adjusting the air mass setpoint value to zero. In this manner, the need for more intense interventions in the start of activation is avoided, even in the event of drift, e.g., of the air system. Instead, the actual cause of air mass errors is corrected. For the case that the average deviation in the air mass corresponds to one of states 3*a* or 3*b*, a state 4*a* or 4*b*, respectively, is reached by simultaneous intervention in the AQ50 regulator and adaptation of the setpoint value. This is particularly true when the error in air quantity is approximately the same magnitude for all cylinders. In other words, the average deviation for all cylinders is also a good representation of the deviation for each individual cylinder.

It is particularly advantageous when the above-described method according to the present invention is combined with other regulators, e.g., regulators for load balancing or lambda compensation. Besides the cylinder-specific combustion position regulator and the global air mass regulator, an additional regulator is used for adjusting the cylinder-specific injection quantity. This regulator performs a compensation by a cylinder-specific correction of the injection quantity, based on the measured signals for rotational speed, lambda, or cylinder pressure.

Figure 4A:
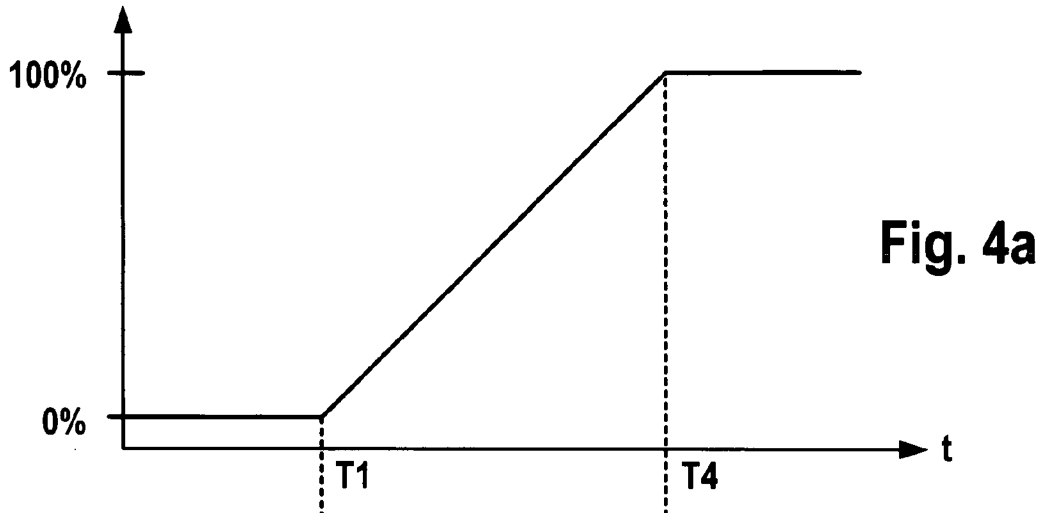
FIGS. 4*a*-4*c* show various signals plotted over time, for illustration of a transition from conventional combustion to partially or entirely homogeneous combustion.
Figure 4B:
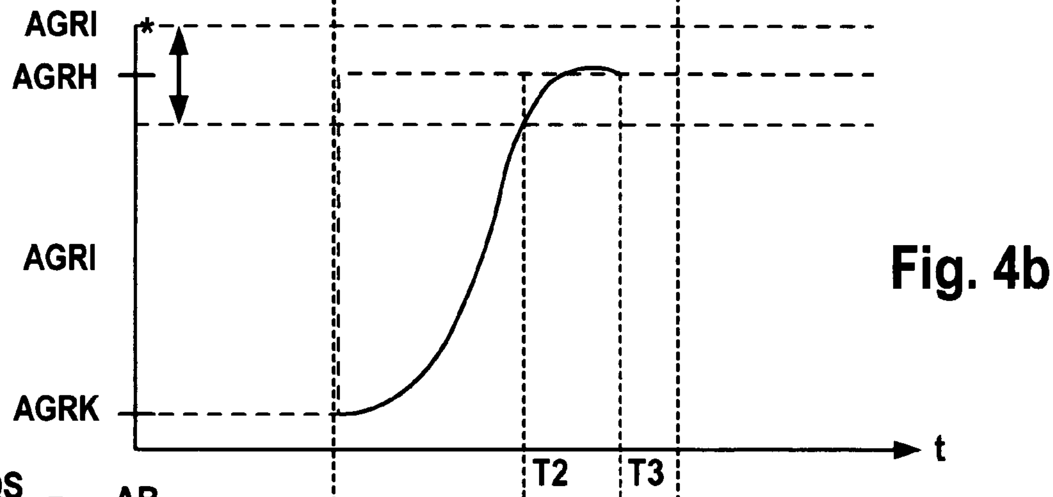
Figure 4C:
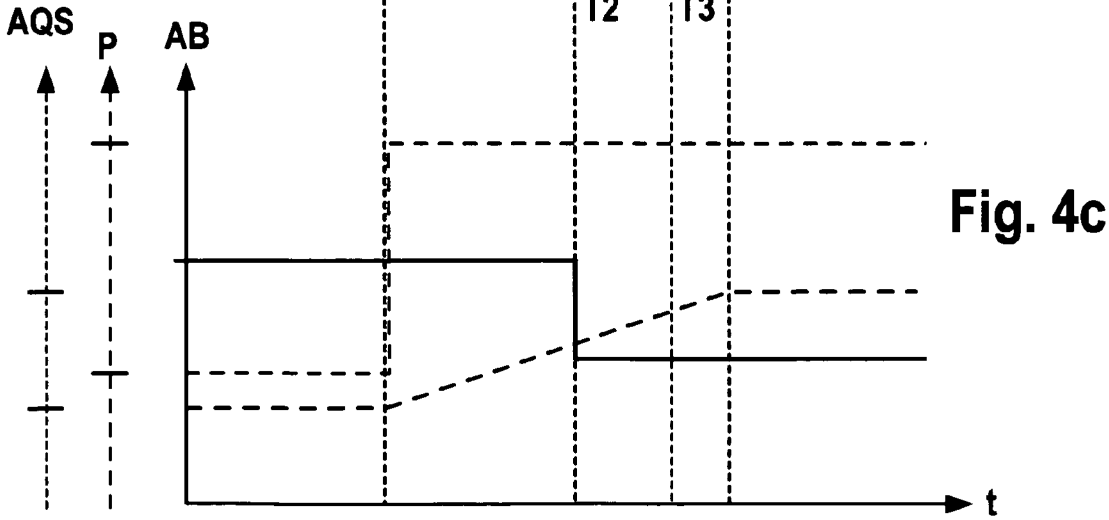

It is advantageous when air mass setpoint value adapter 180 is actuated by control logic unit 170 only in certain operating states. Operating states are defined by one or more of the following variables: status of AQ50 regulator 130, value of the central ramp, operating mode, switching status of the injection, and/or system deviation of air mass regulator 160. It is essential that this adaptation be blocked until the new setpoint value of the air mass after switching is reached. In FIGS. 4*a*-4*c*, this corresponds to time T3, at which the system deviation of the ML regulator is essentially zero. This time is identified when the system deviation of the air mass regulator, i.e., the output signal from node 155, is less than a threshold value. The earliest possible time is when the air mass target value corridor is reached at time T2. The latest possible time is at time T4, at which the central ramp reaches the final value.

The switching status of the injection may also be used as an essential criterion for plausibility checking.

The activation of setpoint value adapter 180 also depends on the state of the AQ50 regulator. In other words, the manipulated variables for this regulator are evaluated for correction/adaptation of the air quantity setpoint value only in the steady-state of the AQ50 regulator. There is no adaptation in non-homogeneous operation.

In one example embodiment, in addition to or as an alternative to the feature used for regulator 130 (i.e., in the exemplary embodiment described above, feature AQ50), it is possible for the control logic unit to use other features which may be determined based on the cylinder pressure or structure-borne noise. Thus, for example, the conclusion as to the deviation of an actual air mass based on feature AQ50 may be checked for plausibility by use of an additional feature such as the combustion rate, for example. For this second feature, a characteristics curve as described for feature AQ50 is then present, which generates the relationship of this feature to the air mass value to be corrected. The adaptation is enabled only in cases for which the computed air mass corrections agree within a predetermined tolerance range.

An example embodiment of the adaptation is described below for the case that no cylinder-specific air mass actuator is present. The average value is generated from the available cylinder-specific corrective interventions in the AQ50 regulator at the start of activation. In other words, the average value of the output signal from the AQ50 regulator is determined over all cylinders. Conclusions as to the corrective deviation in the setpoint air mass are made from the algebraic sign and absolute value of this average value. A deviation in the air mass may be determined by use of a characteristics curve or characteristics map based on the average deviation of the start of activation. Additional performance characteristics may be taken into account when using a characteristics curve. In node 150 (as shown in FIGS. 1 and 2), this correcting value is added to the operating-point-dependent setpoint value which originates from setpoint value setter 145, and after generation of a difference from the actual value of the air mass in node 155, the difference is fed to air mass regulator 160.

For the case where the average deviation in the air mass corresponds to state "3*a*" or state "3*b*" shown in FIG. 3, state "4*a*" or state "4*b*," respectively, is produced by the simultaneous action of the air mass regulator, using the stored adapted ML setpoint value, together with the subsequently activated AQ50 regulator. Within the scope of achievable control performance and air mass adaptation, these states "4*a*" and "4*b*" occur near the intended setpoint state "1" shown in FIG. 3, and therefore represent a significant improvement in the control performance achievable by controlled operation corresponding to state "2*a*" or "2*b*" shown in FIG. 3. This is particularly true when the air mass error is of approximately the same magnitude for all cylinders, i.e., the average deviation for all cylinders is also a good representation of the deviation for each individual cylinder.

A second example embodiment of the adaptation is described below for the case in which a cylinder-specific air mass actuator is present. If cylinder-specific air mass actuators are present, instead of the average value of the corrective interventions in AQ50 regulator 130, the corrective interventions in the particular cylinder for setpoint value adaptation of the air mass are used. In other words, the air mass setpoint values are adapted on a cylinder-specific basis. In this manner, compared to the adaptation using the average value, it is also possible to correct air mass errors that are characterized substantially on a cylinder-specific basis. This results in further improvement with respect to state "2*a*" or "2*b*."

The example embodiment of setpoint value adapter 180 illustrated in FIG. 2 is described in greater detail below. The setpoint value adaptation corresponds to a regulated air-mass correction based on the correction values of the AQ50 regulator. To this end, the average value corresponding to the output signal from averaging unit 200 is compared to a setpoint value in node 210 and the result is supplied to an additional regulator 220. The regulator output then generates the necessary air mass correction, with the result that the air mass setpoint value is modified by this correction until the manipulated variable correction of the start of activation, on average, has reached the setpoint value. The setpoint value for the average value is zero, for example.

FIGS. 4*a*-4*c* show various signals plotted over time t, for illustration of a transition from conventional combustion to partially homogeneous combustion or entirely homogeneous combustion. FIG. 4*a* illustrates a central ramp having values between 0% and 100%. Up to a time T1, conventional combustion occurs and the central ramp has the value 0%. The ramp rises linearly to 100% up to time T4. After time T4, homogeneous combustion or partially homogeneous combustion occurs. The central ramp is used as a factor to weigh various operating characteristic variables during the transition, so that these variables undergo uniform transition from a starting value to a target value.

FIG. 4*b* plots a setpoint value and actual value AGRI for the exhaust gas recirculation rate. The value of the exhaust gas recirculation rate for normal, conventional operation is designated by AGRK, and for partially homogeneous or entirely homogeneous operation the recirculation rate is designated by AGRH. The setpoint value is represented by a dashed line starting at AGRK, and the actual value AGRI is represented by a solid line. After time T1 the setpoint value increases abruptly from value AGRK to value AGRH, which is necessary for homogeneous operation. As a result, after time T1 actual value AGRI gradually increases, and at time T2 reaches a tolerance band represented by two horizontal dashed lines. At time T3 the actual value reaches the setpoint value.

In FIG. 4*c*, setpoint value AQS is represented by a dotted line, rail pressure P by a dashed line, and start of activation AB by a solid line. At time T1 the rail pressure rises to a new setpoint value which is necessary in homogeneous operation. At time T2, start of activation AB drops to its regulated value. From time T1 to time T4, the AQ50 setpoint value increases to its new value according to the ramp function.

In a particularly cost-effective example embodiment, cylinder pressure signals are detected not from all cylinders, but, rather, from at least one cylinder. The features computed from this cylinder pressure signal are taken as representative of the remaining cylinders, and are used in both the AQ50 regulator and the air mass setpoint value adapter. Although no cylinder-specific intervention is possible, multiple cylinders together with a pressure signal detection may be combined into one group, and the regulation may be applied to this group of cylinders, for example, for each bank of V-type engines.

This cost-effective example embodiment allows the use of structure-borne noise sensors without loss of the cylinder-specific intervention capability. In this case, a structure-borne noise signal corresponding to the angular position of the crankshaft is apportioned to the particular cylinder instantaneously involved in the combustion stroke.

During switching between non-homogeneous operation and homogeneous operation, there are various alternative procedures which may be combined with one another as desired. The switching phase between non-homogeneous and homogeneous operation is defined by the time between T1 and T4, and is specified essentially by the change in the setpoint air mass or setpoint exhaust gas recirculation mass, the change in the rail pressure, and/or the change in the setpoint value for feature AQ50. Other variables besides these may also change. Besides the transitions illustrated as examples, other transitions are also possible. All variables may optionally undergo a transition to their new values in a ramp-like manner, abruptly, or according to other functions.

In an example embodiment, the regulation of feature AQ50 occurs during the switching phase. It is particularly advantageous when feature AQ50 is regulated via the start of activation in all operating modes, and only the setpoint value changes as a function of the operating mode. In this regard, it is particularly advantageous when the AQ50 setpoint value is a function of the central ramp. FIGS. 4*a*-4*c* illustrate a linear transition between the AQ50 setpoint values before and after switching. During switching there is no correction of setpoint air mass ML, i.e., adapter 180 is not active. The rapid equalization of the combustion positions of all cylinders during the switching process achieves a portion of the desired constancy of the torque and noise contributions of the cylinders.

It is particularly advantageous when the regulation of the variable characterizing the combustion process occurs in homogeneous operation and/or during the transition to and/or from homogeneous operation.

It is possible to advantageously supplement the AQ50 regulation by additional regulation of the indexed average pressure, which may be obtained from the cylinder pressure, resolved by the crankshaft angle, on a cylinder-specific basis. Alternatively, this regulation may also use the internal or external torque as a controlled variable. Since the setpoint value of the indexed average pressure depends primarily on the intent of the driver and not on the operating mode, it is assumed to be constant during the switching. The corrective intervention in the injection system occurs not via the start of activation, but instead via an intervention in the fuel quantity or an intervention in the duration of activation or delivery. Similarly, the correction also acts on a pilot control value for these variables. The simultaneous action of the combustion position and indexed average pressure regulation affords better torque and noise neutrality compared to control of switching.

The AQ50 regulation may advantageously be further supplemented by a combustion noise regulation. The maximum of the cylinder pressure gradient during a working cycle may be used as the characterizing variable for combustion noise. However, the following cylinder pressure characteristics may also be used as an alternative: maximum of the heating curve, maximum of the heating curve derivative, or a measure of the combustion noise using a measure of structural transmission determined from the cylinder pressure, as used in the test bench indexing method. Other alternatives include significant points and/or variables in the structure-borne noise signal. These regulating variables are held constant during the change in operating mode to avoid a change in noise perceivable by the driver. The following noise-relevant intervention variables come into consideration for this regulation: timing and/or quantity of the pilot injection in the first phase of switching, up to the abrupt or ramped discontinuation of pilot injection at time T2, and/or an adaptation of the AQ50 setpoint value (or of another feature describing the combustion position) in the first and second phases of switching. As a result of the adaptive intervention in the value of the AQ50 setpoint, a second direct regulating intervention in the start of activation of the main injection is avoided. For the regulation of timing/quantity of pilot injection, a structure analogous to the AQ50 regulator shown in FIG. 1 is used, and the adaptation of the AQ50 setpoint value corresponds to the design of the adapter, likewise shown in FIG. 1, for the air mass setpoint value. Therefore, both are not graphically illustrated separately.

What is claimed is:

1. A device for controlling an internal combustion engine, comprising:

an arrangement for determining a deviation value by comparing a variable characterizing a combustion process in at least one cylinder of the internal combustion engine with a corresponding setpoint value;

an arrangement for adjusting, based on the deviation value, a first manipulated variable of a first actuator for influencing the start of injection; and an arrangement for adjusting, based on the first manipulated variable, a second manipulated variable of a second actuator for influencing the air mass.

2. A method for controlling an internal combustion engine, comprising:

determining a deviation value by comparing a variable characterizing a combustion process in at least one cylinder of the internal combustion engine with a corresponding setpoint value;

adjusting, based on the deviation value, a first manipulated variable of a first actuator for influencing the start of injection; and adjusting, based on the first manipulated variable, a second manipulated variable of a second actuator for influencing the air mass.

3. The method as recited in claim 2, wherein the variable characterizing the combustion process is determined based on an output signal from one of an engine-structure-borne noise sensor and a combustion chamber pressure sensor.

4. The method as recited in claim 2, wherein at least one of the following is used as the variable characterizing the combustion process: a) the start of combustion; b) a percentage point of the total energy conversion from combustion; c) a combustion rate; and d) an output signal from an engine-structure-borne noise sensor.

5. The method as recited in claim 2, wherein for each cylinder of the internal combustion engine, the variable characterizing the combustion process is regulated to a setpoint value, using the start of injection as the first manipulated variable.

6. The method as recited in claim 5, wherein the regulation of the variable characterizing the combustion process occurs in at least one of the following: a) in homogeneous operation; b) in partially homogenous operation; c) during a transition to homogeneous operation; d) during a transition to partially homogenous operation; e) during a transition from homogeneous operation; and f) during a transition from partially homogenous operation.

7. The method as recited in claim 2, wherein the second manipulated variable is specified from an average value of deviation values determined for at least two cylinders of the internal combustion engine.

8. The method as recited in claim 7, wherein the average value is regulated to a setpoint value.

9. The method as recited in claim 8, wherein the average value is regulated to a setpoint value only in selected operating modes of the internal combustion engine.

* * * * *